Patented Feb. 22, 1927.

1,618,204

UNITED STATES PATENT OFFICE.

FRIEDRICH JOHANNSEN, OF CLAUSTHAL-ON-THE-HARZ, GERMANY, ASSIGNOR TO FRIED. KRUPP GRUSONWERK AKTIENGESELLSCHAFT, OF MAGDEBURG-BUCKAU, GERMANY.

TREATMENT OF ORES AND METALLURGICAL PRODUCTS.

No Drawing. Application filed December 6, 1924, Serial No. 754,438, and in Germany December 7, 1923.

This invention relates to the treatment of ores and metallurgical products and residues of various kinds, and has particular reference to the volatilization therefrom of volatilizable metals, such as zinc, tin, lead, cadmium, arsenic, antimony and bismuth, and their recovery in the form of oxides.

Large quantities of such ores and products, such as poor calamine and galena ores, lowgrade brass, hard zinc and furnace sweepings and waste products, are not suitable for the direct production of zinc owing to the small quantity of zinc which they contain or on account of their foreign constituents, so that recourse must be had to the production of oxides as an intermediate product. There are also certain iron ores, such as bog iron ore, and burnt out pyrites, which are rendered lowgrade by the zinc which they contain.

The treatment of such materials in a furnace in an oxidizing atmosphere, which is produced by a heating flame with excess of air, is well known (see Patent No. 959,924, Dedolph, May 31, 1910), fusion of the material taking place when this method of treatment is employed. The disadvantage of this method of treatment however is that volatilization takes place to a reduced extent only from the very commencement of the fusion.

It has also been proposed (see Patent No. 1,269,110, Ohlmer, June 11, 1918) to introduce the material mixed with reducing substances into a rotary furnace, and at the same time subject it to the action of a reducing flame or reducing gases at a suitable temperature. In this method of treatment however a considerable excess of heat and energy has to be expended.

In contradistinction to this and other known processes the present invention comprises a process in which a layer of the material to be treated mixed with carbonaceous fuel is continuously fed into and passed through a furnace in which an oxidizing atmosphere is maintained and in which the layer of material is continuously rolled round, the said material being mixed with a quantity of fuel sufficient to effect the reduction of the volatilizable metals without causing fusion of the mass during the reaction while at the same time supplying by its combustion the balance of the heat required to cause the process to be maintained continuously. As the temperature of the mass does not rise to the fusion point during the reaction, the mass remains in a pulverulent or clinkered state and is not fused or smelted during the volatilization of the metal.

If for example a zinc-containing material of the kind above referred to be introduced, mixed with any desired fuel in a solid condition, into a rotary furnace, the material becomes highly heated, as its external surface is continually changing and oxidizes vigorously while the material is rolled round. Owing to the maintenance of a sufficiently thick layer of material in the furnace the incandescent particles of fuel effect, in the absence of air from the interior of the material, a vigorous reduction and volatilization of the volatilizable metals, particularly zinc. The metal vapors that escape and the gases formed in the reduction burn with evolution of heat as soon as they issue from the layer of material, and the products of the combustion of the metals are recovered from the waste gases in the form of oxidized compounds by well known methods. By means of the present invention the entire process is simplified and also cheapened by the considerable reduction which it effects in the consumption of fuel whilst at the same time complete oxidation in the reaction zone is ensured.

The complete oxidation of the metal vapors and the gaseous products of reduction being thus ensured, the heat generated thereby is utilized in the reduction zone to maintain the endothermic reduction reaction which is there proceeding to an extent which has not been possible with methods heretofore employed.

In certain cases it is advisable to provide a temporary or permanent, direct or indirect, heating to supplement if necessary the heating furnished by combustion of the metal fume and reduction gases (for example carbon monoxide).

Such additional heating is temporarily used at the outset of the operation to initiate the reducing reaction which may in many cases continue thereafter without additional heating. In other cases some additional heating by flame or otherwise may be required. In all cases, however, the reducing and volatilizing operation is effected without the fusion of the material. In the main however the quantity of fuel required for the entire process must be provided by the amount of fuel mixed with the material treated. Another advantage which the new process also possesses is that lowgrade fuels such as coal dust, crude lignite and coke breeze can be used.

The following are examples of the manner in which my process may be carried out:—

Brass sweepings containing 15% Zn, 12% Cu, 14% carbonaceous material (partly graphitic) and 52% $SiO_2$ were treated in the following manner: to the brass ashes was added 15% coke and the charge was delivered into a furnace of about 40 meters long at the rate of 2500 kg. per hour. The furnace was provided at the exit end with an oil burner by which the furnace could be heated at the beginning of the run to a bright red heat. This burner was in the next few hours kept going only at a diminished rate until the furnace heat reached the desired temperature. In the further operation this additional firing was not necessary, so that it was omitted. The heating of the metal vapors and reduction gases burning in the oxidizing furnace atmosphere completely sufficed for keeping up the operation and for preheating the charge. The oxides and oxide combinations of volatilized metal were collected from the gases in a Cottrell precipitator and recovered.

As a second example calamine ores may be worked in a similar manner. Since these ores usually contain considerable calcium carbonate and are damp, the water must be vaporized in the beginning of the process and the $CO_2$ driven off. The operation is as follows:—the finely divided ore in the form of a slurry is mixed with an excess of carbon, for example 25%, and delivered to the furnace just as in example 1, and after it has been brought to the proper temperature in the furnace, metal volatilization takes place in the central portion of the furnace, while at the exit end only a combustion of the excess carbon takes place, so that the combustion gases of this excess carbon furnish additional heat for the process.

In the reaction zone a temperature of about 1000° C. to 1300° C., which is below the melting point of the material, should be maintained so as to effect a good recovery of zinc from the material. The zinc vapors and carbon monoxide pass out from the continually rotating layer of material mixed with coke and are immediately burned in the atmosphere rich in oxygen which is present above said layer in the furnace, the heat thus produced being utilized for the reduction of the metalliferous material contained in the layer of material under treatment. The result which is practically obtained in this way is that the strongly endothermic reduction of the zinc oxide (ZnO) is compensated by the heat of formation of the oxide which is again produced. To balance unavoidable losses of heat and to maintain the requisite temperature in the furnace, as also to compensate for heat losses in the waste gases and by radiation, the quantity of reducing material employed is such that the process can be continuously carried on without any other source of heat, so that the process becomes essentially a self-sustaining one so far as heat requirements are concerned. Towards the exit end of the furnace the residue cools off while at the same time preheating the air. The process is started by means of auxiliary heating.

The residue is obtained in pulverulent form. The iron content of the core is in the residue in the form of magnetic oxide or metallic iron and can be recovered in the usual way.

As a third example, the process may be applied to the residues from zinc retorts which contain besides slag particles 15% zinc and 30% carbon. An addition of further carbonaceous material is not necessary. In this case, it is desirable to furnish from time to time additional heat because of the difficultly combustible character of the carbon in these residues, and because of the small content of zinc.

In all these examples, there remains in the residues only about 1% or less of zinc, so that in these processes there is a recovery of 95% or better of the zinc in the material treated.

The examples given above illustrate the many uses to which the process according to the present invention can be applied, but it will be understood that it is also applicable to the treatment of other materials containing volatilizable metals or compounds thereof.

The accompanying drawing shows diagrammatically an apparatus for carrying out the process.

Referring to this drawing, A is a rotary kiln of the usual type, which in practice may be 40 meters long and 2 meters in diameter. The charge to be treated is fed into the furnace through the chute B. The gaseous and vaporized products from the furnace pass out through the flue C into any suitable collecting device such as a Cottrell precipitator or bag house. At the lower end of the inclined rotary furnace is provided a hood D provided with an opening E for the admission of air. The residual products are discharged through a chute F at the lower portion of the hood into any suitable receptacle, such as a car G. H is an oil or gas burner, the flame of which is used to start the process, or as a supplementary source of heat which may from time to time be required.

Having now particularly described and ascertained the nature of my said invention and in what manner the same is to be performed, I declare that what I claim is:

1. The continuous process of recovering volatilizable metal or metals from ores, metallurgical products and residues of various kinds, which comprises causing the material to be treated to be continuously charged together with a carbonaceous reducing agent into a heated metallurgical furnace in which an oxidizing atmosphere is maintained, and to travel therethrough in a constantly rolled round layer, and burning the volatilized metals and combustible gases in contact with the charge whereby the charge is sufficiently heated to cause continued reduction and volatilization, without slagging or fusion of the charge in the reduction zone.

2. A process as claimed in claim 1 in which the amount of carbonaceous fuel mixed with the charge is sufficient to effect the reduction of the volatilized metals and to supply by its combustion additional heat.

3. A process as claimed in claim 1 in which additional heat is applied to the charge.

4. The continuous process of recovering volatilizable metal or metals from ores, metallurgical products and residues of various kinds which comprises causing the material to be treated to be continuously charged together with carbonaceous fuel into a heated metallurgical furnace in which an oxidizing atmosphere is maintained, and to travel therethrough in a constantly agitated layer, the amount of carbon present being sufficient to effect the reduction and to provide by combustion additional heat, burning the volatilizable metals and combustible gases in contact with the charge whereby the charge is sufficiently heated to cause continued reduction and volatilization, supplying additional heat when necessary to the charge, the conditions being so controlled that slagging or fusion of the charge in the reduction zone is avoided.

In testimony whereof the foregoing specification is signed.

FRIEDRICH JOHANNSEN.

Certificate of Correction.

Patent No. 1,618,204.  Granted February 22, 1927, to

FRIEDRICH JOHANNSEN.

It is hereby certified that error appears in the above-numbered patent requiring correction as follows: The drawing containing the figure as shown below should be inserted as part of the Letters Patent:

Feb. 22, 1927.  F. JOHANNSEN  1,618,204
TREATMENT OF ORES AND METALLURGICAL PRODUCTS
Filed Dec. 6, 1924

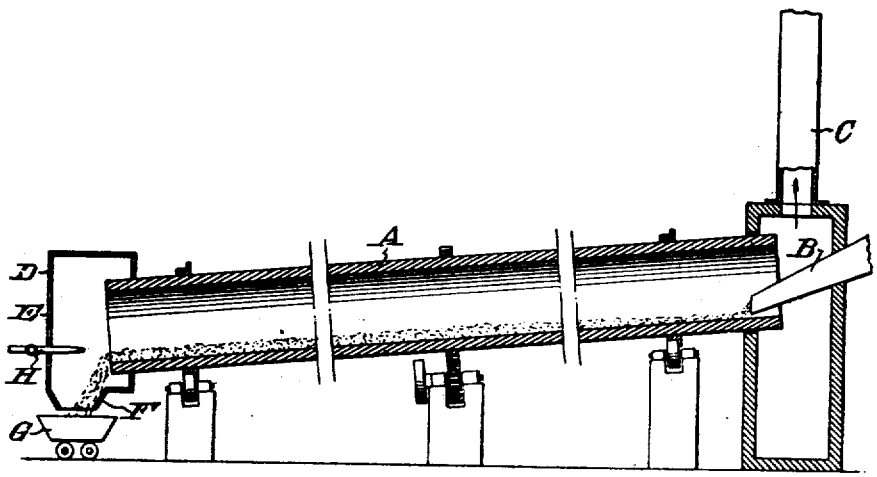

and that the said Letters Patent should be read with this correction therein that the same may conform to the record of the case in the Patent Office.

Signed and sealed this 28th day of June, A. D. 1927.

[SEAL.]
M. J. MOORE,
*Acting Commissioner of Patents.*